June 16, 1964 K. HERTEL 3,137,059
TOOL HOLDER
Filed Jan. 16, 1963 2 Sheets-Sheet 1
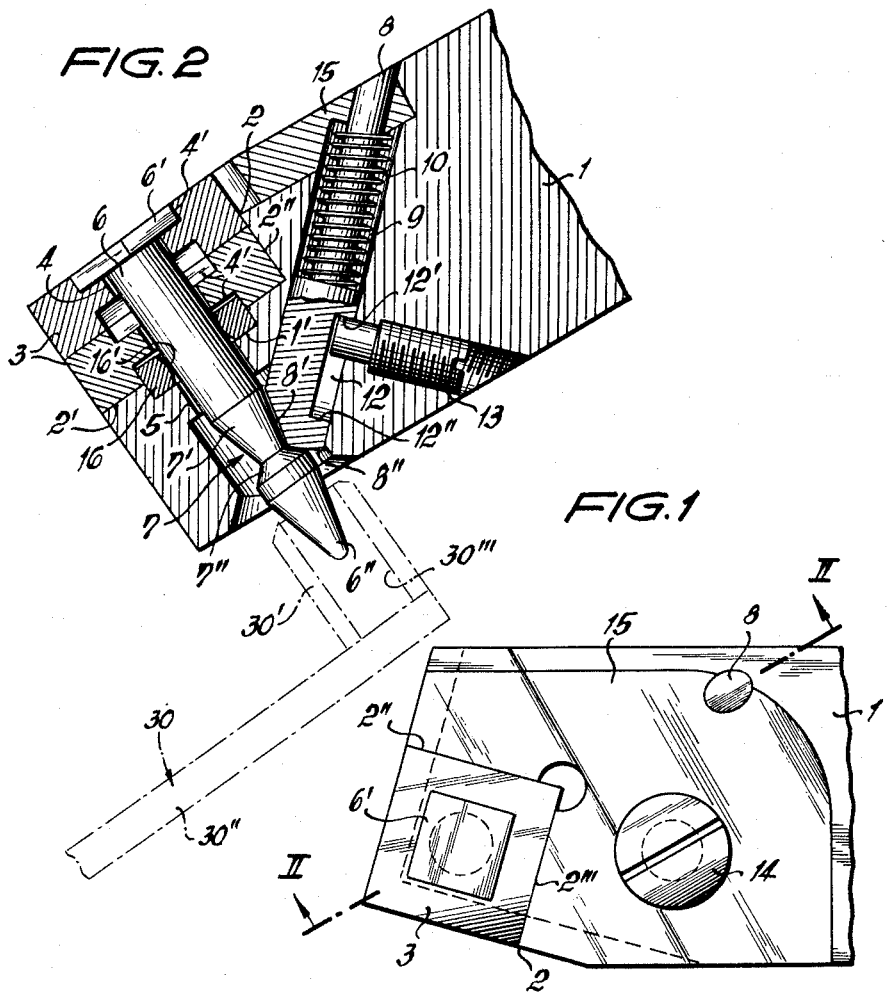
INVENTOR
KARL HERTEL
BY M. Oleur and Toren
ATTORNEYS June 16, 1964 K. HERTEL 3,137,059
TOOL HOLDER
Filed Jan. 16, 1963 2 Sheets-Sheet 2
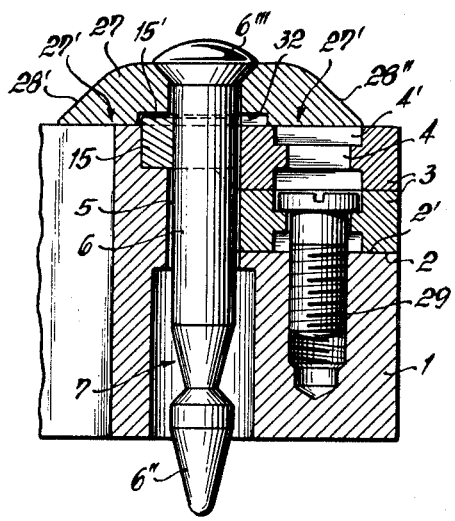
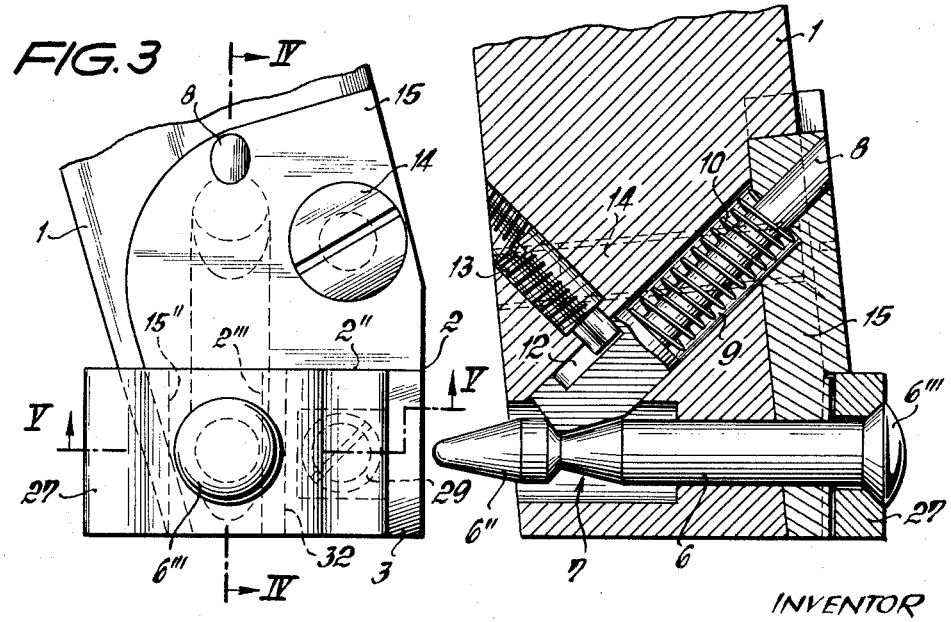
INVENTOR
KARL HERTEL
BY McGlew and Toren
ATTORNEYS

3,137,059
TOOL HOLDER
Karl Hertel, Oedenbergerstrasse 29, Nurnberg, Germany
Filed Jan. 16, 1963, Ser. No. 251,772
Claims priority, application Germany Jan. 18, 1962
11 Claims. (Cl. 29—96)

The present invention relates to improvements in a tool holder of the known type for a lathe or other machine tool in which a cutter, with several cutting edges, which is made of high-speed steel, hard metal, or a sintered cutting material in mounted in a recess of the tool holder, cutter head, or the like by means of a tension or clamping bolt. The cutter, which may consist, for example, of a square plate, has a central bore through which the clamping bolt is inserted into a continuous guide bore in the tool holder. By means of its head which acts upon the outer side of the cutter, the clamping bolt exerts a tension upon the cutter which presses the latter against the bottom or base of the recess in the tool holder in which the cutter is mounted and which is open toward three sides. This tension upon the clamping bolt is produced in this known tool holder by a locking member in the form of a setscrew, the end of which is applied under pressure at an acute angle against the surface of a recess in the clamping bolt. For tightening or loosening the clamping bolt, it is therefore necessary to turn the mentioned screw several times about its axis in one direction or the other. Consequently, if it becomes necessary, for example, on a cutter head, to change the cutting edges on several cutters, this changing operation takes up a considerable length of time which could be devoted to the production of workpieces.

It is therefore an important object to the present invention to design and improve a tool holder of the above-mentioned type in a manner so as to permit the entire cutter to be exchanged very quickly, or its position in the tool holder to be quickly changed, so as to present a new cutting edge.

For attaining this object, the invention provides a locking member which, instead of consisting of a setscrew or the like, is adapted to engage with the clamping bolt and to lock the same in its clamping position under the action of a spring and to disengage from and release the clamping bolt when the locking member is retracted against the action of this spring. The front end of this locking member, which projects into the channel in the tool holder which contains the clamping bolt, is provided with a sliding surface which is disposed at an acute angle to the axis of the clamping bolt and is adapted to engage with the latter to push back the locking member against the action of its spring when the clamping bolt is being inserted into the tool holder.

Another feature of the invention consists in designing the tool holder in a manner so as to permit another surface of the front end of the locking member, which is adapted to engage the locking surface in a recess of the clamping bolt, to be easily accessible from the outside of the tool holder to permit the locking member to be disengaged from the clamping bolt when the cutter is to be exchanged, or when its position in the tool holder is to be changed, to provide a new cutting edge.

For this purpose, the end of the bolt channel in the tool holder is provided with an enlarged recess around the front part of the clamping bolt and the locking recess therein. This enlarged recess of the bolt channel permits a special tool, for example, a socket wrench or the like, to be inserted to push against the last-mentioned surface of the locking member to disengage the latter from the clamping bolt.

The invention further provides suitable means for preventing the locking member from sliding too deeply into the bolt channel under the action of its spring when the clamping bolt is withdrawn from this channel, since the reinsertion of the clamping bolt would then be difficult. For this purpose, it is advisable to limit the extent of the stroke of the locking member, for example, by providing it with a longitudinal groove, the ends of which serve as stops by engaging with the end of a setscrew. In order to facilitate the insertion of the clamping bolt against the spring pressure of the locking member and to reduce the friction and wear between these two elements, the front end of the clamping bolt is tapered, preferably at an angle which is substantially equal to the angle of the sliding surface of the front end of the locking member relative to the axis of the clamping bolt.

The pressure which is exerted by the compression spring upon the locking member in the axial direction thereof produces not only a tension upon the clamping bolt in the axial direction thereof but also a pressure component which is directed transversely to the clamping bolt. In order to utilize this transverse pressure component, the invention provides that the bolt channel be made of a size so that the clamping bolt has a certain amount of lateral play therein, and it further provides in the bolt channel an annular part with a transversely rounded inner surface which surrounds the clamping bolt and engages the same substantially without play and is located at a level adjacent to the bottom of the tool-holding recess of the tool holder. This annular part, which may consist, for example, of a separate centering member, forms a pivot for the clamping bolt. The transverse pressure component which is applied by the locking member upon the longer part of the lever, which is formed by the clamping bolt between the locking recess of the bolt and this pivot point, then results, through the shorter part of the lever between the pivot point and the head of the bolt, in a considerable lateral force which is exerted upon the cutter in the direction opposite to the mentioned transverse pressure component and presses the cutter strongly against the side walls of the tool-holding recess of the tool holder.

The tool holder according to the invention is further designed so that the axis of the locking member is disposed within a plane which intersects the front and rear corners of the square tool-holding recess. This has the result that the cutter will be pressed by the leverage of the head of the clamping bolt against the side walls of the tool-holding recess even though, as the result of inaccuracies in manufacture or a reduction of the size of the cutter through regrinding, the dimensions of this recess might differ from those of the cutter.

The head of the clamping bolt may be countersunk completely into the cutter if the chips are to pass freely over the cutter. If the chips are, however, to be broken, the head of the clamping bolt may be applied indirectly upon the cutter insofar as its tension is exerted upon a clamping plate which is made of a particular shape so as to act as a chip breaker and rest at one side on the tool holder and at the other side on the upper surface of the cutter.

The tool holder according to the invention is especially suitable for being used when the cutting edge of the cutter should have a front rake of zero or a negative front rake. This is desirable in order to reduce the danger of breakage of the cutting edges of hard-metal cutters.

The aforementioned as well as additional features and advantages of the present invention will become more clearly apparent from the following detailed description thereof which is to be read with reference to the accompanying drawings, in which—

FIGURE 1 shows a top view of the head of a tool holder according to the invention, in which the cutter is directly secured by a clamping bolt;

FIGURE 2 shows a cross section which is taken along the line II—II of FIGURE 1;

FIGURE 3 shows a top view of a tool holder head according to a modification of the invention, in which the cutter is indirectly secured by a clamping plate which also serves as a chip breaker and;

FIGURES 4 and 5 are sectional views on the lines IV—IV and V—V of FIG. 3, respectively.

In all of the drawings, the tool holder is generally indicated at 1. It has a tool-holding recess 2 which is open toward three sides and is defined at the other three sides by a bottom wall 2' and the two side walls 2'' and 2'''. As may be seen in FIGURE 2, recess 2 may be, for example, of such a depth that it may hold not only the cutter 3 which is first to be used, but also a similar cutter which serves as a replacement.

The two cutters 3 are square plates whose edges form the cutting edges. Each plate may be mounted in the tool holder so as to have a negative front rake. In view of the length of its eight cutting edges, each cutter can therefore be changed practically sixteen times to a new cutting edge. Each cutter has a central cylindrical aperture 4 and on each side a larger square recess 4'. Coaxially to the apertures in cutters 3, tool holder 1 is provided with a channel 5, the end of which opposite to the recess 2 extends into an enlarged recess 5' opening to one side of the tool holder. Cutters 3 are secured in tool holder 1 by a tension or clamping bolt which is generally indicated at 6. Its square head 6' engages into the corresponding recess 4' of the upper cutter 3. Clamping bolt 6 has a double conical shaped locking recess 7, one cone of which, 7', is acute-angled and the other, 7'', obtuse-angled. The front part of clamping bolt 6 is tapered so as to form an acute-angled truncated cone 6'' which ends outside of the enlarged recess 5'. The locking recess 7 of bolt 6 is operatively associated with a locking member whose axis extends at an acute angle to the axis of clamping bolt 6 and which is slidable longitudinally in a bore or channel 9 of the tool holder and is acted upon by a compression spring 10 in this channel. The front end of locking member 8 is provided with a sliding surface 8' and a locking surface 8''. When the clamping bolt 6 is inserted into the bolt channel 5, the conical front end 6'' slides along the sliding surface 8' and thereby pushes back the locking member 8 until the latter snaps into the locking recess 7' and, under the action of spring 10, the locking surface 8'' of locking member 8 presses against the surface 7'' and thereby exerts a tension upon clamping bolt 6. Since the locking surface 8'' projects beyond the surface of the conical surface 7'', it is accessible from the outside through the open end of recess 5'. In order to facilitate the disengagement of locking member 8 from the clamping bolt 6, a specially formed socket wrench 30 or the like may be provided which has a socket 30' and a relatively long handle 30'', as indicated in dot-and-dash lines in FIGURE 2. The cylindrical socket bore 30''' has a depth equal to the length of socket 30' and this length, in turn, corresponds at least to the sum of the axial length from the tip of cone 6'' to the truncated cone 7' and the thickness of cutter 3. After disengaging the clamping bolt 6 from locking member 8 by means of the socket wrench 30, the latter may therefore be further inserted into recess 7 until clamping bolt 6 is further lifted at least to the extent of the thickness of cutter 3 so that the cutter together with clamping bolt 6 may then be turned about the axis of the latter to provide a new cutting edge. Locking member 8 is further provided with a longitudinal groove 12, the end surfaces 12' and 12'' of which serve as stops to limit the extent of the movements of the locking member by engaging with a setscrew 13. The engagement of setscrew 13 with the stop 12' prevents the locking member 8 from entering too far into the recess 7 when clamping bolt 6 is partly or entirely withdrawn from the tool holder.

Fitted into the tool holder 1 and removably secured thereto by a screw 14 is a locking plate 15 which may be easily made of very accurate dimensions so as to increase the locking action upon the cutter 3. The tool holder further contains a centering member 16 which has the same square shape as the head 6' of clamping bolt 6 but a thickness which is almost twice that of the head 6'. One half of this thickness of centering member 16 engages into the recess 4' of the replacement cutter 3, while the other half engages into a corresponding square recess 1' in tool holder 1. The axial bore of centering member 16 has a transversely rounded or convex surface 16' and its minimum diameter and the diameter of the shaft of bolt 6 are of substantially the same size so that there is practically no play between them. As indicated in FIGURE 2, channel 5 and each cylindrical axial hole 4 in the two cutters 3 have so much play relative to clamping bolt 6 that, due to its engagement with the rounded surface 16' of centering member 16, clamping bolt 6 acts like a lever with unequal arms and can carry out a lateral pivoting movement whereby the upper cutter 3 is pressed diagonally thereof against the side walls 2'' and 2''' of recess 2 and the corresponding walls of locking plate 15.

In the embodiment of the invention as above described and illustrated in FIGURES 1 and 2, locking member 8 and clamping bolt 6 are disposed within a plane perpendicular to the outer surface of cutter 3 and which intersects the cutting point or tip of the cutter, the axis of clamping bolt 6, the corner between the side walls 2'' and 2''', and the axis of locking member 8.

FIGURES 3 and 5 illustrate a modification of the invention in which the cutter is mounted outside of the plane which intersects with the clamping bolt 6 and the locking member 8. The fillister head 6''' of clamping bolt 6 is countersunk into a clamping plate 27 which is pressed upon the tool holder 1 at 27' and 27''. The pressing surfaces of the clamping plate may be spaced at different distances from clamping bolt 6 so that, when clamping plate 27 is turned 180° about the axis of bolt 6, it bears upon the cutter at a different point. The ascending surfaces 28' and 28'' of the clamping plate are shaped so that either of them may act as a chip breaker. Underneath the upper cutter 3 either a replacement cutter or a special spacing plate is removably secured in the recess 2 of the tool holder by means of a headed setscrew 29. The recess 4' in the cutter or the spacing plate may in this case be cylindrical rather than square. This modification has the advantage that the cutter plate does not have to be of a particular size and shape but that any commercial size may be employed.

All other parts of the embodiment according to FIGURES 3 to 5 are equal to their corresponding parts as described with reference to FIGURES 1 and 2 and therefore do not need to be mentioned again.

Between its bearing surfaces 27' and 27'' clamping plate 27 is provided with a transverse groove 32 into which a corresponding projection 15' on locking plate 15 engages. As indicated in FIGURE 3, this projection 15' engages at 15'' with the corresponding vertical lateral surface which defines the transverse groove 32. The torque which is produced by the chip pressure on the chip-breaking part of clamping plate 27 in the direction toward clamping bolt 6 is thus taken up by the locking plate 15 at 15''.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A tool comprising, in combination, a tool holder having a recess in one surface arranged to seat and confine a cutter element, a first bore extending through said tool holder substantially perpendicular to the seating surface of said recess and opening into said recess, a cutter element seated and confined in said recess, a bolt extending into said bore and through an aperture in said cutter element, said bolt having a head at its outer end engageable with said cutter element to retain the same in said recess, said bolt having a latching formation adjacent to its inner end, a locking member slidable mounted in a second bore in said tool holder intersecting said first bore at an acute angle, the inner end of said locking member being formed to engage said latching formation to draw said bolt inwardly to firmly clamp said cutter element in said recess, and spring means in said second bore engaging said locking member and biasing the same into locking engagement with said bolt, the latching formation of said bolt and the inner end of said bolt into said first bore, to displace said locking member in opposition to the force of said spring until the inner end of said locking member is aligned for engagement with said latching formation.

2. A tool as claimed in claim 1, in which the inner end of said first bore opens into an enlarged outwardly opening recess intersected by said second bore, the inner end of said locking member being biased by said spring into said enlarged recess and being accessible from the open end of said recess for retraction of said locking member to disengage said bolt.

3. A tool, as claimed in claim 1, in which said first bore has a diameter larger than that of the shank of said bolt so that said bolt has play within said first bore, and an annular bearing member seated in said tool holder concentric with said first bore and engaging said bolt intermediate the ends of the latter, the inner peripheral surface of said annular member having a close conforming fit with said bolt and being formed to permit limited pivoting of said bolt within said first mentioned bore.

4. A tool as defined in claim 1, further comprising means for limiting the extent of the movement of said locking member into said bore under the action of said spring when said bolt is retracted from said bore, to prevent the front end of said locking member from entering too deeply into said bore.

5. A tool holder as defined in claim 1, in which said cutter element and said recess have a corresponding square shape, the axis of said locking member being disposed within a plane perpendicular to the seating surface of said recess and intersecting two opposite corners of said recess.

6. A tool, as claimed in claim 1, in which said latching formation on said bolt comprises a first conical surface converging toward the inner end of said bolt and continued as a second conical surface diverging toward the inner end of said bolt, the inner end of said locking member having a first surface arranged for substantially conforming engagement with said second conical surface to lock said bolt.

7. A tool, as claimed in claim 1, in which said cutter element is a substantially flat plate, at least one surface of said plate being formed with a recess conformingly seating the head of said bolt in flush relation.

8. A tool, as claimed in claim 1, including a clamping plate having an inner surface with a pair of longitudinally spaced bearing portions, one bearing portion being arranged to engage said cutter element and the other bearing portion being arranged to engage a surface of said tool holder, said clamping plate having an aperture therethrough alignable with said first bore for extension of said bolt therethrough with the head of said bolt overlying said clamping plate, the outer surface of said clamping plate being formed to function as a chip breaker.

9. A tool, as claimed in claim 3, wherein the inner peripheral surface of said annular bearing member is convex in an axial direction.

10. A tool, as claimed in claim 6, in which the inner end of said locking member has a second surface substantially conformingly engageable with the first conical surface on said bolt whereby, upon insertion of said bolt into said bore, said first conical surface on said bolt will engage said second surface on the inner end of said locking member to displace said locking member against the force of said spring.

11. A tool, as claimed in claim 8, in which the inner surface of said clamping plate is formed with a groove extending between said two bearing portions, said tool holder having a projection thereon engageable in said groove to prevent said clamping plate turning about the axis of said bolt.

No references cited.